(12) United States Patent
Totsuka et al.

(10) Patent No.: US 10,425,022 B2
(45) Date of Patent: Sep. 24, 2019

(54) MOTOR DRIVE CONTROLLER FOR MOTOR WITH THREE-PHASE WINDINGS

(71) Applicant: MINEBEA MITSUMI Inc., Nagano (JP)

(72) Inventors: Shinji Totsuka, Shizuoka (JP); Wataru Nogamida, Shizuoka (JP); Satoshi Hatahara, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 15/817,647

(22) Filed: Nov. 20, 2017

(65) Prior Publication Data
US 2018/0205331 A1   Jul. 19, 2018

(30) Foreign Application Priority Data

Jan. 13, 2017 (JP) ................................ 2017-004375

(51) Int. Cl.
*H02K 29/06* (2006.01)
*H02P 6/10* (2006.01)
*H02P 27/08* (2006.01)

(52) U.S. Cl.
CPC ................ *H02P 6/10* (2013.01); *H02P 27/08* (2013.01)

(58) Field of Classification Search
CPC ........................................................ H02P 6/10
USPC .................................................... 318/400.23
See application file for complete search history.

(56) References Cited

U.S. PATENT DOCUMENTS

2002/0190674 A1   12/2002   Yasohara et al.
2012/0212170 A1   8/2012   Matsui et al.

FOREIGN PATENT DOCUMENTS

| JP | 2002-078373 | 3/2002 |
| JP | 2002-354887 | 12/2002 |
| WO | 2011/117932 | 9/2011 |

OTHER PUBLICATIONS

Japanese Office Action for 2017-004375 dated May 28, 2019.

*Primary Examiner* — Erick D Glass
(74) *Attorney, Agent, or Firm* — IPUSA, PLLC

(57) ABSTRACT

A motor drive controller includes a control unit configured to control a motor drive unit, wherein the motor drive unit includes switching circuits for the three-phase windings, respectively, each of the switching circuits including two switching elements, wherein the control unit is configured to place a first switching element among the two switching elements in an "on" state for an energization period while placing a second switching element among the two switching elements in an "off" state, to place the second switching element alternately in the "on" and "off" states for the energization period while placing the first switching element in the "off" state, and to control the second switching element in an overlapping period during which two adjacent windings among the three-phase windings are placed in a same energization state, such that a magnitude of energization of the two adjacent windings changes gradually in a linear or nonlinear fashion.

16 Claims, 8 Drawing Sheets

MOTOR DRIVE CONTROLLER FOR MOTOR WITH THREE-PHASE WINDINGS

BACKGROUND OF THE INVENTION

1. Field of the Invention

The disclosures herein relate to a motor drive controller.

2. Description of the Related Art

There are publications that disclose a motor drive device for driving a motor so as to reduce torque ripple during the motor operation (e.g., Patent Document 1).

The motor drive device disclosed in Patent Document 1 includes a motor having three-phase drive coils (i.e., windings), a wide-angle energizer for energizing each phase coil for an electric angle of 150 degrees, and an energization controller for controlling the magnitude of energization of each phase coil by the wide-angle energizer. The wide-angle energizer is capable of detecting the overlap period during which two adjacent phase coils are placed in the same energized state. The energization controller sets the magnitude of energization of a phase coil during the overlap period to a first constant value, and sets the magnitude of energization of a phase coil during a period other than the overlap period to a second constant value.

The technology disclosed in Patent Document 1 tends to create distortion in power supply current. An increase in the distortion occurring in power supply current may cause increases in motor vibration and noise, for example.

One aspect of the present disclosure may be to provide a motor drive controller that enables the reduction of distortion occurring in power supply current.

RELATED-ART DOCUMENTS

Patent Document

[Patent Document 1] Japanese Patent Application Publication No. 2002-354887

SUMMARY OF THE INVENTION

It is a general object of the present invention to provide a motor drive controller that substantially obviates one or more problems caused by the limitations and disadvantages of the related art.

According to an embodiment, a motor drive controller includes a motor drive unit configured to drive a motor having three-phase windings, and a control unit configured to control the motor drive unit such that each of the three-phase windings is energized for an energization period greater than 120 electrical degrees and smaller than 180 electrical degrees, wherein the motor drive unit includes an inverter that includes switching circuits for the three-phase windings, respectively, each of the switching circuits including two switching elements which are a high-side switching element coupled to a positive side of a power supply and a low-side switching element coupled to a negative side of the power supply, wherein the control unit is configured to place a first switching element among the two switching elements in an "on" state for the energization period while placing a second switching element among the two switching elements in an "off" state, and to place the second switching element alternately in the "on" state and in the "off" state for the energization period while placing the first switching element in the "off" state, and wherein the control unit is configured to control the second switching element in an overlapping period during which two adjacent windings among the three-phase windings are placed in a same energization state, such that a magnitude of energization of the two adjacent windings changes gradually in a linear or nonlinear fashion.

According to one aspect of the present disclosures, distortion occurring in power supply current is reduced.

DESCRIPTION OF THE PREFERRED EMBODIMENTS

In the following, a description will be given of a motor drive device according to an embodiment.

Figure 1:
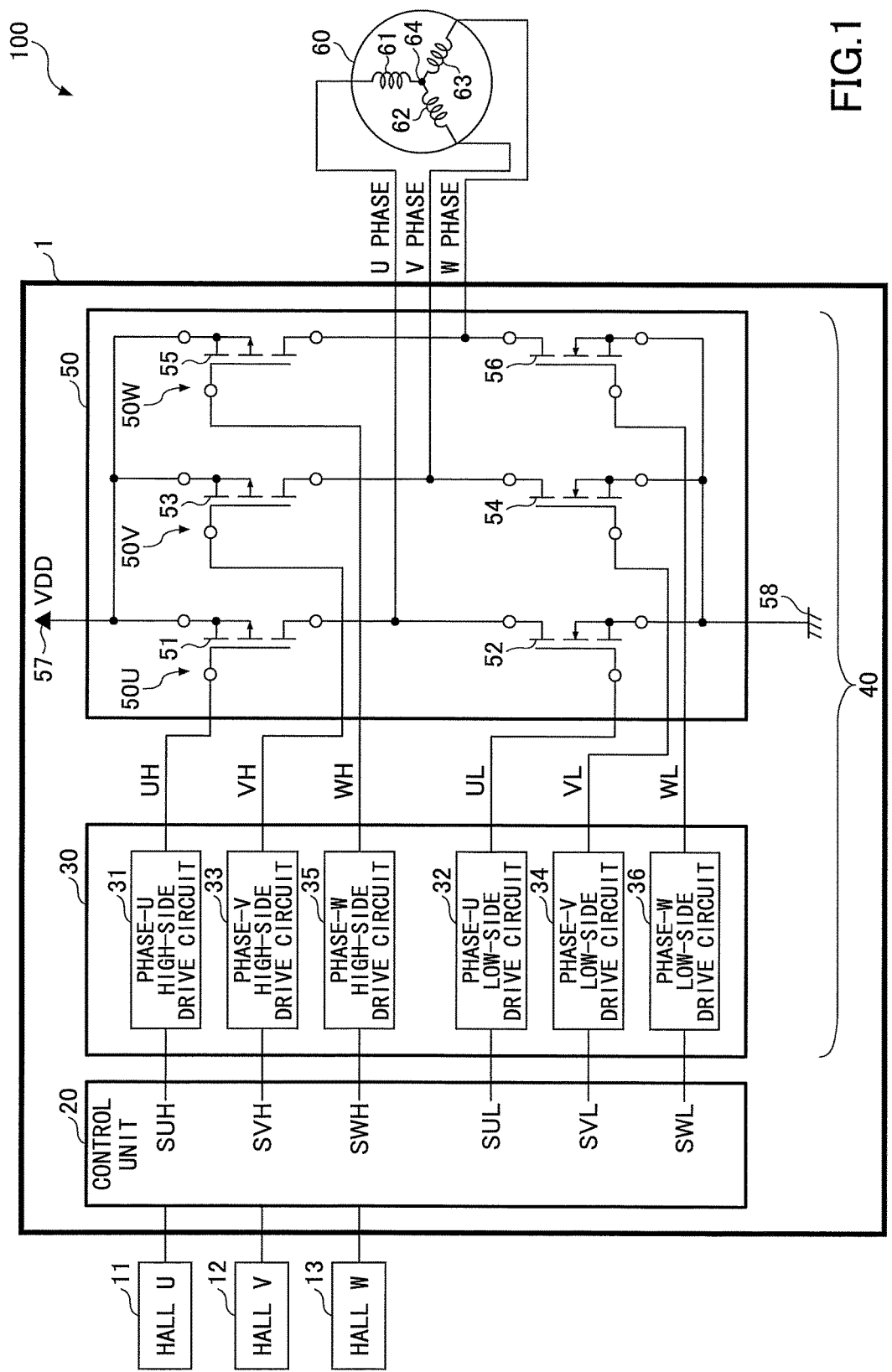
FIG. 1 is a drawing illustrating an example of the configuration of a motor control system having a motor drive controller.

FIG. 1 is a drawing illustrating an example of the configuration of a motor control system having a motor drive controller. A motor control system 100 illustrated in FIG. 1 is an example of the system that controls the rotation of a motor 60. The motor control system 100 includes the motor 60 and a motor drive controller 1.

The motor 60 has a plurality of windings. The motor 60 may be a three-state brushless motor having a phase-U winding 61, a phase-V winding 62, and a phase-W winding 63. The phase-U winding 61, the phase-V winding 62, and the phase-W winding 63 are connected together at a star point 64. The phase-U winding 61, the phase-V winding 62, and the phase-W winding 63 are an example of the three-phase windings.

The motor drive controller 1 drives the motor 60. The motor drive controller 1 includes a control unit 20 and a motor drive unit 40.

The control unit 20 is an example of the control unit that controls a motor drive unit for driving a motor having three-phase windings. The control unit 20 generates drive control signals SUH, SVH, SWH, SUL, SVL, and SWL in response to phase signals that are output from respective phase detecting devices 11, 12, and 13 in accordance with the phase of the rotor in the motor 60. A specific example of the control unit 20 may be a microcomputer having a CPU (central processing unit).

The phase detecting devices 11, 12, and 13, which are disposed at equal intervals around the rotor of the motor 60, may be Hall elements that detect the phase of the rotor in the motor 60. The phase detecting devices 11, 12, and 13 detect the main magnetic fields for driving the rotor to produce phase signals indicative of the rotational position (i.e., rotational phase) of the rotor relative to the respective phase windings 61, 62, and 63.

The motor drive unit 40 drives the motor 60 in accordance with the drive control signals SUH, SVH, SWH, SUL, SVL, and SWL generated by the control unit 20. The motor drive unit 40 includes an inverter drive unit 30 and an inverter 50.

In response to the drive control signals SUH, SVH, SWH, SUL, SVL, and SWL, the inverter drive unit 30 generates drive signals UH, VH, WH, UL, VL, and WL for provision to the inverter 50. The inverter drive unit 30 uses the generated drive signals UH, VH, WH, UL, VL, and WL to drive the inverter 50. The inverter drive unit 30 generates the drive signals UH, VH, WH, UL, VL, and WL for driving the inverter 50 such that an AC sinusoidal drive current flows through each of the phase windings 61, 62, and 63 in the motor 60.

The inverter drive unit 30 includes drive circuits 31 through 36. The drive circuit 31 produces the drive signal UH for driving a transistor 51 in response to the drive control signal SUH. The drive circuit 33 produces the drive signal VH for driving a transistor 53 in response to the drive control signal SVH. The drive circuit 35 produces the drive signal WH for driving a transistor 55 in response to the drive control signal SWH. The drive circuit 32 produces the drive signal UL for driving a transistor 52 in response to the drive control signal SUL. The drive circuit 34 produces the drive signal VL for driving a transistor 54 in response to the drive control signal SVL. The drive circuit 36 produces the drive signal WL for driving a transistor 56 in response to the drive control signal SWL.

The inverter 50 causes drive currents to flow through the respective phase windings 61, 62, and 63 in response to the drive signals UH, VH, WH, UL, VL, and WL, thereby rotating the rotor in the motor 60.

The inverter 50 includes the transistors 51 through 56. The transistors 51, 53, and 55 are an example of high-side switching elements that are connected to a positive side 57 of the DC power supply. The transistors 52, 54, and 56 are an example of low-side switching elements that are connected to a negative side 58 (i.e., the ground side) of the DC power supply. The transistors 51 through 56 are turned on or off by the drive signals UH, UL, VH, VL, WH, and WL, respectively. An example of the transistor is a field effect transistor (FET). In this case, the transistors 51, 53, and 55 are p-channel-type FETs, and the transistors 52, 54, and 56 are n-channel-type FETs.

The inverter 50 has the switching circuits, each including a high-side switching element and a low-side switching element, for the respective phase windings 61, 62, and 63. A switching circuit 50U provided for the phase-U winding 61 includes the transistor 51 and the transistor 52. A switching circuit 50V provided for the phase-V winding 62 includes the transistor 53 and the transistor 54. A switching circuit 50W provided for the phase-W winding 63 includes the transistor 55 and the transistor 56.

A connection point between the transistor 51 and the transistor 52 is coupled to one end of the phase-U winding 61. A connection point between the transistor 53 and the transistor 54 is coupled to one end of the phase-V winding 62. A connection point between the transistor 55 and the transistor 56 is coupled to one end of the phase-W winding 63. The other ends of the phase-U winding 61, the phase-V winding 62, and the phase-W winding 63 are connected to each other at the star point 64.

Figure 2:
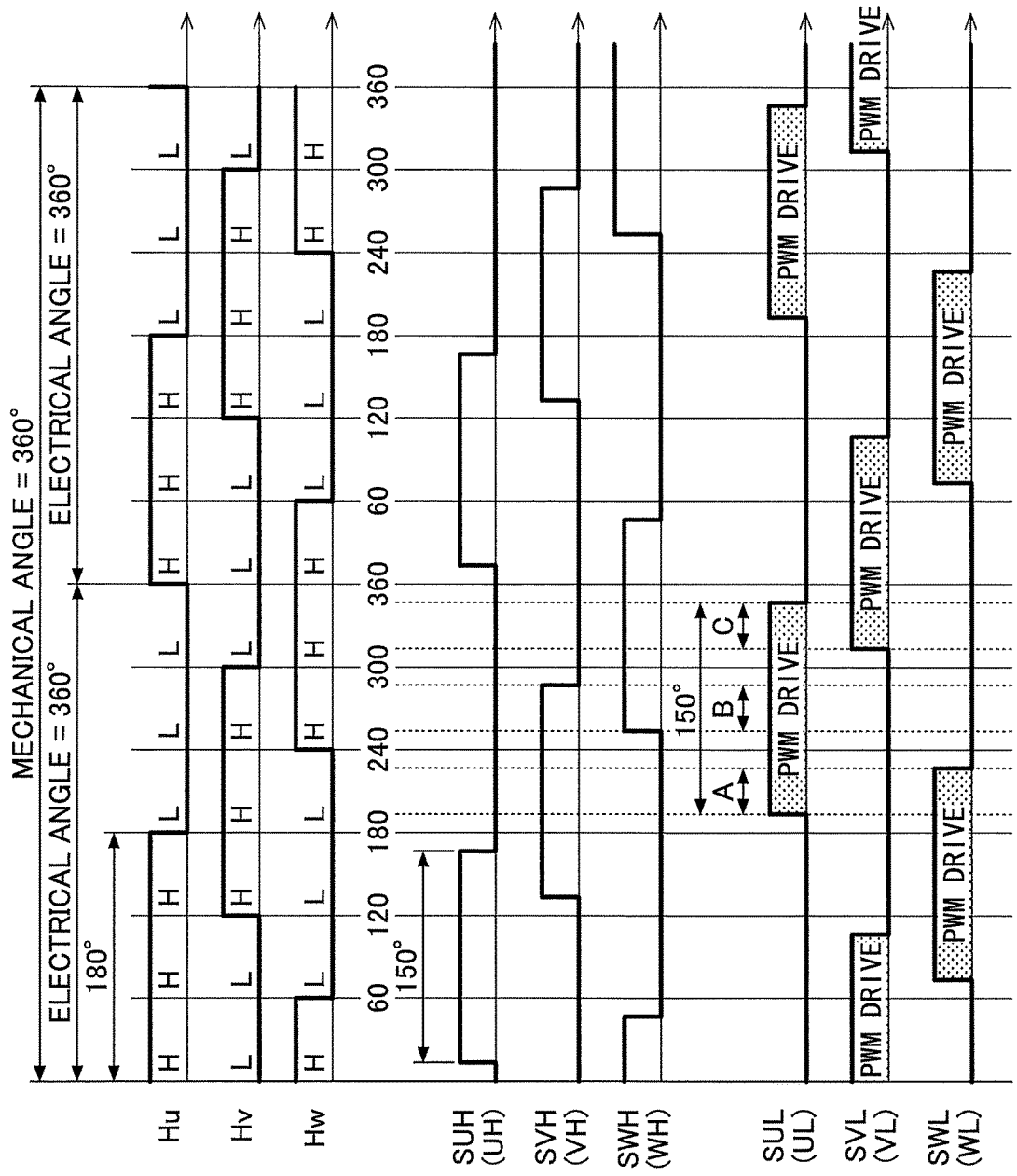
FIG. 2 is a timing chart illustrating an example of drive timing.

FIG. 2 is a timing chart illustrating an example of drive timing. FIG. 2 illustrates an example of the control of the motor drive unit 40 performed by the control unit 20 such that each of the phase windings 61, 62, and 63 is energized for an energization period of a 150-degree electric angle.

As illustrated in FIG. 2, the control unit 20 places the transistors 51, 53, and 55 in the "on" state for an energization period of 150 degrees in the switching circuits 50U, 50V, and 50W, respectively, when the transistors 52, 54, and 56 are placed in the "off" state, respectively. Specifically, the control unit 20 keeps the drive control signal SUH at such a signal level as to place the high-side transistor 51 in the "on" state for an energization period of 150 degrees while the control unit 20 keeps the drive signal SUL at such a signal level as to place the low-side transistor 52 in the "off" state. The same applies in the case of the control of the transistors 53 and 54 in the phase-V switching circuit 50V and in the case of the control of the transistors 55 and 56 in the phase-W switching circuit 50W.

As illustrated in FIG. 2, the control unit 20 alternately places the transistors 52, 54, and 56 in the "on" state and in the "off" state for an energization period of 150 degrees in the switching circuits 50U, 50V, and 50W, respectively, when the transistors 51, 53, and 55 are placed in the "off" state, respectively. Specifically, the control unit 20 sets the drive control signal SUL at such signal levels as to drive the low-side transistor 52 with pulse width modulation (PWM) for an energization period of 150 degrees while the control unit 20 keeps the drive signal SUH at such a signal level as to place the high-side transistor 51 in the "off" state. The same applies in the case of the control of the transistors 53 and 54 in the phase-V switching circuit 50V and in the case of the control of the transistors 55 and 56 in the phase-W switching circuit 50W.

Further, the control unit 20 controls the low-side transistors 52, 54, and 56 such as to change the magnitude of energization of two adjacent windings gradually in a linear or nonlinear fashion (i.e., gradually along a straight line or along a curve) during overlapping periods A, B, and C during which these two adjacent windings among the phase windings 61, 62, and 63 are placed in the same energization condition. For example, the control unit 20 changes the waveforms of the drive control signals SUL, SVL, and SWL gradually in a linear or nonlinear fashion for controlling the respective transistors 52, 54, and 56 during the overlapping periods A, B, and C. With this arrangement, the magnitude of energization of two adjacent windings is gradually changed in a linear or nonlinear fashion during the overlapping periods A, B, and C.

The overlapping period during which two adjacent windings are placed in the same energization state refers to the period during which two adjacent windings are both placed in forward energization, or the period during which two adjacent windings are both placed in reverse energization. The overlapping period A illustrated in FIG. 2 is the period during which the two adjacent windings 61 and 63 are placed in the same energization state. The overlapping period B illustrated in FIG. 2 is the period during which the two adjacent windings 62 and 63 are placed in the same energization state. The overlapping period C illustrated in FIG. 2 is the period during which the two adjacent windings 61 and 62 are placed in the same energization state.

Figure 3:
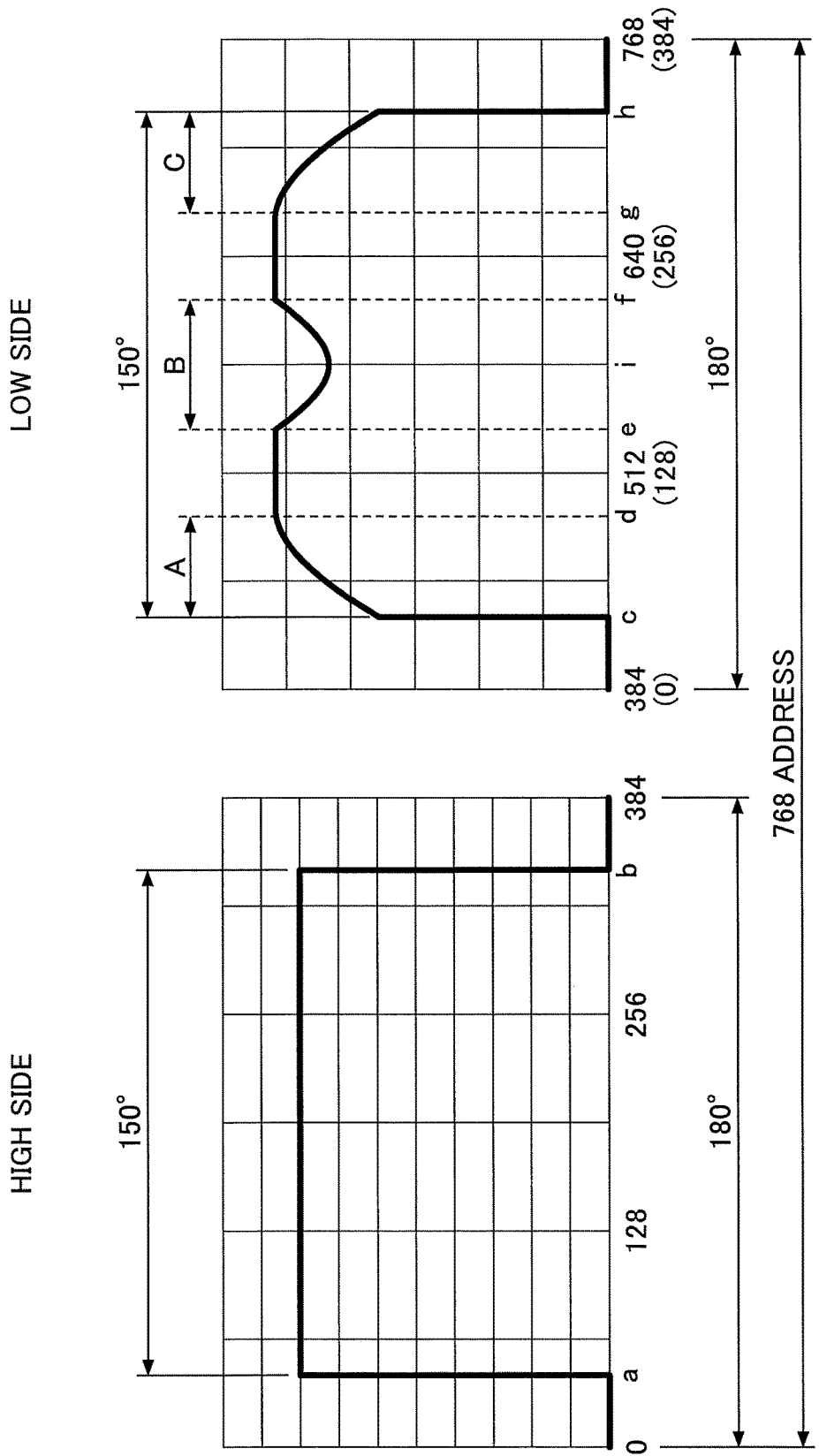
FIG. 3 is a drawing showing an example of the waveforms of drive control signals.

FIG. 3 is a drawing illustrating an example of the waveforms of the drive control signals SUH, SVH, SWH, SUL, SVL, and SWL.

The control unit 20 produces the drive control signals SUH, SVH, and SWH each having the waveform illustrated on the left-hand side of FIG. 3 when placing the transistors 51, 53, and 55 in the "on" state for the respective 150-degree energization periods. With this arrangement, the drive signals UH, VH, and WH having a constant voltage are supplied from the drive circuits 31, 33, and 35 to the high-side transistors 51, 53, and 55, respectively.

Moreover, the control unit 20 produces the drive control signals SUL, SVL, and SWL each being a PWM signal corresponding to the waveform illustrated on the right-hand side of FIG. 3 when placing the low-side transistors 52, 54, and 56 alternately in the "on" state and in the "off" state for the respective 150-degree PWM drive periods. With this arrangement, the pulse-width-modulated drive signals UL, VL, and WL are supplied from the drive circuits 32, 34, and 36 to the low-side transistors 52, 54, and 56, respectively. The waveform illustrated on the right-hand side of FIG. 3 is an example of the waveform according to which the magnitude of energization of two adjacent windings is gradually changed in a nonlinear fashion (along a curve) during the overlapping periods A, B, and C. Namely, the duty ratio of the PWM signal that is the drive control signals SUL, SVL, and SWL is changed according to the value of the waveform illustrated on the right-hand side of FIG. 3.

According to the present embodiment described above, the control unit 20 is configured to change the magnitude of energization of two adjacent windings gradually in a linear or nonlinear fashion for the overlapping periods A, B, and C during which these two adjacent windings among the phase windings 61, 62, and 63 are placed in the same energization state. This arrangement serves to reduce distortion in power supply current and ripples in power supply current in comparison with the related-art configuration in which the magnitude of energization is kept at a constant value during the overlapping periods during which two adjacent windings are placed in the same energization state.

It may be noted that the control unit 20 may be configured to change the magnitude of two adjacent windings gradually in a linear or nonlinear fashion for at least one of the overlapping periods A, B, and C, which also serves to reduce distortion in power supply current and ripples in power supply current.

In the following, the configuration of the control unit 20 will be described in detail.

Figure 4:
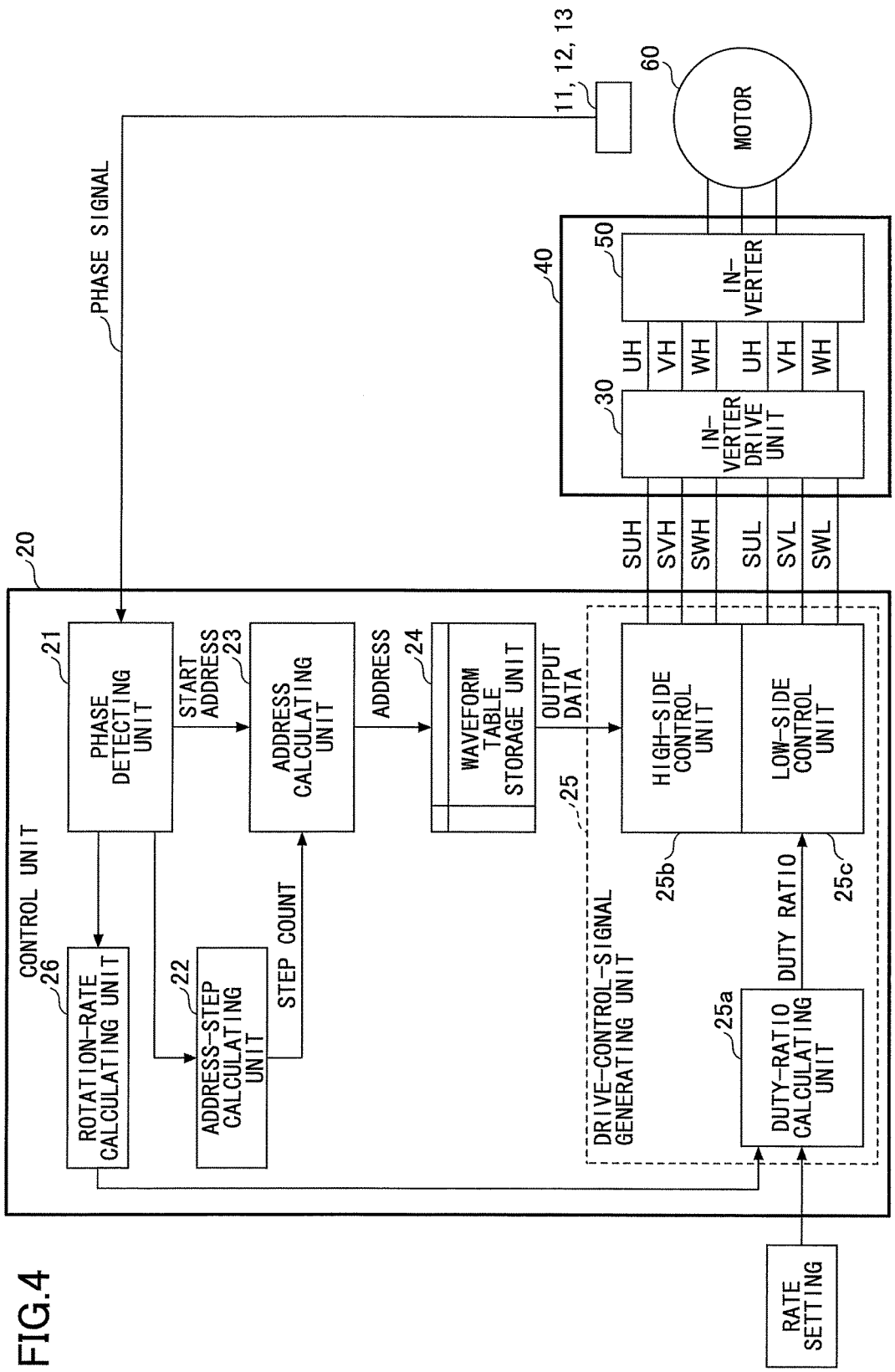
FIG. 4 is a drawing illustrating an example of the configuration of a control unit.

FIG. 4 is a drawing illustrating an example of the configuration of the control unit. The control unit 20 illustrated in FIG. 4 includes a phase detecting unit 21, an address-step calculating unit 22, an address calculating unit 23, a waveform table storage unit 24, a drive-control-signal generating unit 25, and a rotation-rate calculating unit 26. Part or all of the functions of the phase detecting unit 21, the address-step calculating unit 22, the address calculating unit 23, the drive-control-signal generating unit 25, and the rotation-rate calculating unit 26 may be implemented as programs stored in memory and executed by a CPU. Alternatively, these part or all of the functions may be implemented as a hardware circuit.

The phase detecting unit 21 generates a plurality of phase pattern signals Hu, Hv, and Hw (see FIG. 2) in response to phase signals that are output from respective phase detecting devices 11, 12, and 13 in accordance with the phase of the rotor in the motor 60. The phase detecting unit 21 includes comparators that receive the phase signals output from the phase detecting devices 11, 12, and 13, respectively, for example. The phase detecting unit 21 uses the comparators each reshaping the waveform of a respective one of the phase signals, thereby producing the phase pattern signals Hu, Hv, and Hw which have a phase displacement of 120 electrical degrees with each other.

In FIG. 2, the phase pattern signals Hu, Hv, and Hw differ in phase from each other by 120 electrical degrees. "H" represents a high level, and "L" represents a low level.

The phase detecting unit 21 illustrated in FIG. 4 interpolates at least one of the phase pattern signals Hu, Hv, and Hw at 15-degree intervals for one cycle such that the energization period of the phase windings 61, 62, and 63 can be set to a period of 150 electrical degrees. It may be noted that the divisions of one cycle is not necessarily by the 15-degree intervals, but may be made by finer intervals (e.g., 10-degree intervals).

The phase detecting unit 21 detects an edge (i.e., a falling edge from the high level to the low level or a rising edge from the low level to the high level) of at least one of the phase pattern signals Hu, Hv, and Hw. The phase detecting unit 21 determines a start address for accessing the waveform table storage unit 24 in response to the detected edge.

The address-step calculating unit 22 determines a step count of the address for accessing the waveform table storage unit 24 in response to the cycle of at least one of the phase pattern signals Hu, Hv, and Hw.

The address calculating unit 23 calculates successive addresses starting from the start address determined by the phase detecting unit 21 such that each of the successive addresses corresponds to a respective step count determined by the address-step calculating unit 22.

The waveform table storage unit 24 stores in advance waveform data indicative of the waveforms of the drive control signals SUH, SVH, SWH, SUL, SVL, and SWL.

FIG. 3 is a drawing illustrating an example of the waveform data stored in the waveform table storage unit. The graphic chart on the left-hand side of FIG. 3 shows an example of the waveform data indicative of the waveform of the drive control signals SUH, SVH, and SWH, which are used to drive the high-side transistors 51, 53, and 55, respectively. The graphic chart on the right-hand side of FIG. 3 shows an example of the waveform data indicative of the waveform of the drive control signals SUL, SVL, and SWL, which are used to drive the low-side transistors 52, 54, and 56, respectively.

The graphic chart on the left-hand side of FIG. 3 illustrates a waveform data portion from address "0" to address "384" among the entire waveform data from address "0" to address "768", which corresponds to a range of 360 electrical degrees equal to one cycle of the drive control signals SUH, SVH, and SWH. Each address from address "a" to address "b" stores a positive constant value. Each address from address "0" to address "a−1" and each address from address "b+1" to address "384" store a non-negative value (e.g., zero) smaller than this constant value.

The graphic chart on the right-hand side of FIG. 3 illustrates a waveform data portion from address "384" to address "768" among the entire waveform data from address "0" to address "768", which corresponds to a range of 360 electrical degrees equal to one cycle of the drive control signals SUL, SVL, and SWL. Each address from address "c" to address "h" stores a positive value. Each address from address "384" to address "c−1" and each address from address "h+1" to address "768" store a non-negative value (e.g., zero) smaller than this positive value. Each address from address "c" to address "d" stores a positive value that increases as the address increases. Each address from address "g" to address "h" stores a positive value that decreases as the address increases. Each address from address "d" to address "e" and each address from address "f"

to address "g" store a positive constant value. Each address from address "e" to address "i" stores a positive value that decreases as the address increases. Each address from address "i" to address "f" stores a positive value that increases as the address increases. Address "i" is the midpoint address between address "e" and address "f".

In FIG. 4, the drive-control-signal generating unit 25 receives from the waveform table storage unit 24 a plurality of waveform data stored at the addresses calculated by the address calculating unit 23. The drive-control-signal generating unit 25 generates the drive control signals SUH, SVH, SWH, SUL, SVL, and SWL having the waveforms of the plurality of waveform data retrieved from the waveform table storage unit 24.

The drive-control-signal generating unit includes a duty-ratio calculating unit 25a, a high-side control unit 25b, and a low-side control unit 25c.

The high-side control unit 25b receives from the waveform table storage unit 24 the waveform data indicative of the waveforms of the high-side drive control signals SUH, SVH, and SWH, and generates, based thereon, the drive control signals SUH, SVH, and SWH. The high-side control unit 25b outputs the drive control signals SUH, SVH, and SWH placing the high-side transistors 51, 53, and 55 in the "on" state for the respective 150-degree energization periods.

The low-side control unit 25c receives from the waveform table storage unit 24 the waveform data indicative of the waveforms of the low-side drive control signals SUL, SVL, and SWL, and generates, based thereon, the drive control signals SUL, SVL, and SWL. The low-side control unit 25c outputs the drive control signals SUL, SVL, and SWL for PWM driving of the low-side transistors 52, 54, and 56 in the respective 150-degree energization periods on the basis of the duty ratio calculated by the duty-ratio calculating unit 25a. More specifically, the low-side control unit 25c uses the duty ratio calculated by the duty-ratio calculating unit 25a as a reference duty ratio (e.g., as the maximum duty ratio), and changes the duty ratio of the drive control signals SUL, SVL, and SWL in accordance with the waveform data received from the waveform table storage unit 24.

The duty-ratio calculating unit 25a calculates the duty ratio which serves as a basis for PWM driving of the low-side transistors 52, 54, and 56, such that the difference between the rotation rate of the rotor in the motor 60 calculated by the rotation-rate calculating unit 26 and the rotation rate specified by a rate setting supplied from an external source becomes zero.

The rotation-rate calculating unit 26 calculates the rotation rate of the rotor in the motor 60 (i.e., the number of revolutions per unit time) based on the cycle of the phase pattern signals Hu, Hv, and Hw generated by the phase detecting unit 21.

Figure 5:
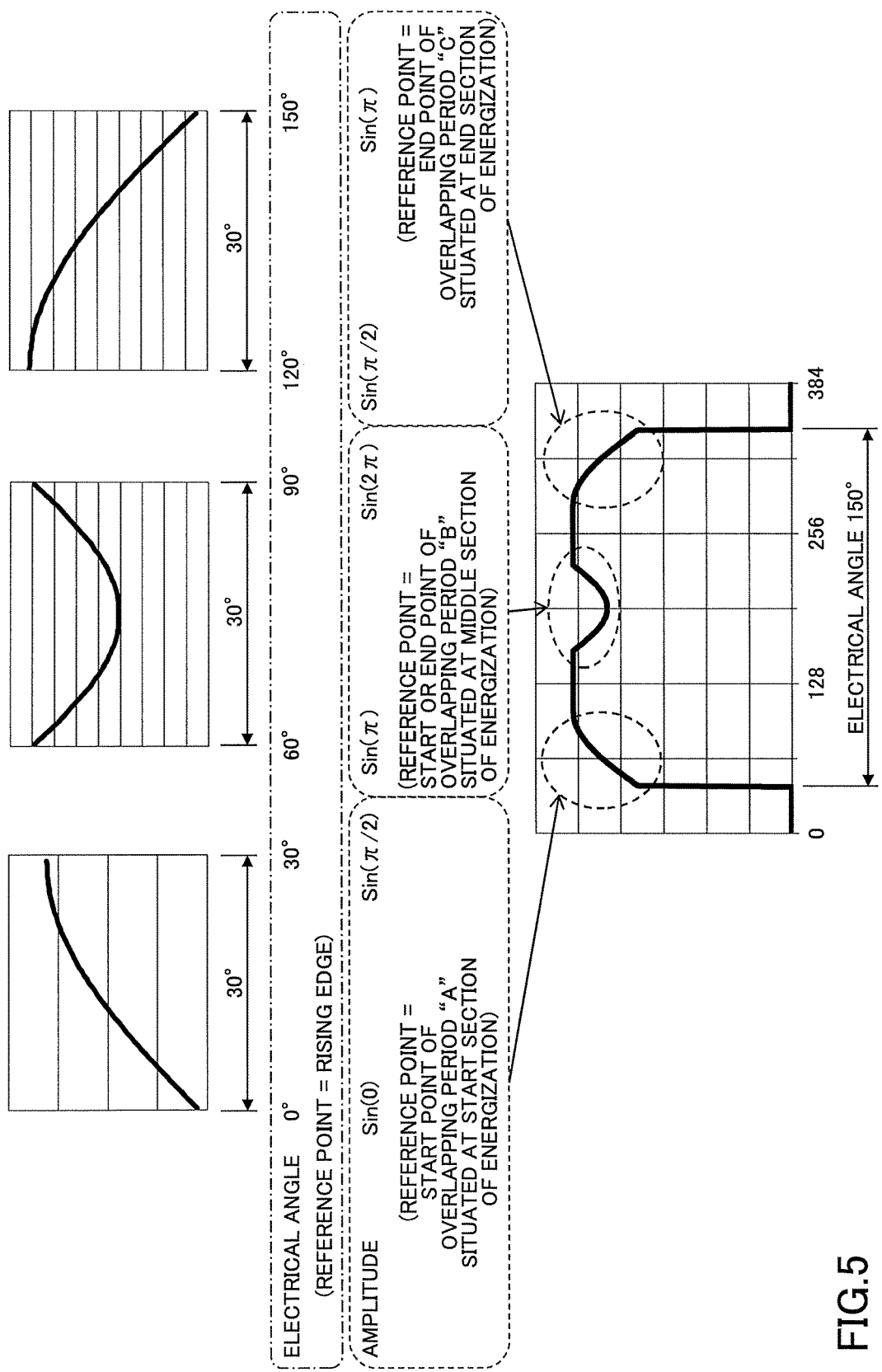
FIG. 5 is a drawing illustrating an example of the energization waveform of a drive control signal that exhibits a sinusoidal change in overlapping periods.

FIG. 5 is a drawing illustrating an example of the energization waveform of a drive control signal that exhibits a sinusoidal change in the overlapping periods A, B, and C.

The control unit 20 causes the magnitude of energization of two adjacent windings to exhibit a sinusoidal increase in the overlapping period A situated at a start section of the energization period, and causes the magnitude of energization of the two adjacent windings to exhibit a sinusoidal decrease in the overlapping period C situated at an end section of the energization period. Further, the control unit 20 causes the magnitude of energization of the two adjacent windings to dip in the overlapping period B situated at a middle section of the energization period. In the following, specific details will be described.

The control unit 20 generates the low-side drive control signals SUL, SVL, and SWL each of which exhibits a sinusoidal rise from $\sin(0)$ to $\sin(\pi/2)$ in the overlapping period A (which is a period of 30 electrical degrees in the case of FIG. 5) situated at the start section of the 150-degree energization period. With this arrangement, the magnitude of energization of two adjacent windings exhibits a sinusoidal rise from $\sin(0)$ to $\sin(\pi/2)$ in the overlapping period A, which serves to reduce distortion occurring in power supply current.

The control unit 20 generates the low-side drive control signals SUL, SVL, and SWL each of which exhibits a sinusoidal decrease from $\sin(\pi/2)$ to $\sin(\pi)$ in the overlapping period C (which is a period of 30 electrical degrees in the case of FIG. 5) situated at the end section of the 150-degree energization period. With this arrangement, the magnitude of energization of two adjacent windings exhibits a sinusoidal decrease from $\sin(\pi/2)$ to $\sin(\pi)$ in the overlapping period C, which serves to reduce distortion occurring in power supply current.

The control unit 20 generates the low-side drive control signals SUL, SVL, and SWL each of which exhibits a sinusoidal curve dip from $\sin(\pi)$ to $\sin(2\pi)$ in the overlapping period B (which is a period of 30 electrical degrees in the case of FIG. 5) situated at the middle section of the 150-degree energization period. With this arrangement, the magnitude of energization of two adjacent windings dips (i.e., in the form of a sinusoidal curve from $\sin(\pi)$ to $\sin(2\pi)$) in the overlapping period B, which serves to reduce distortion occurring in power supply current.

Figure 6:
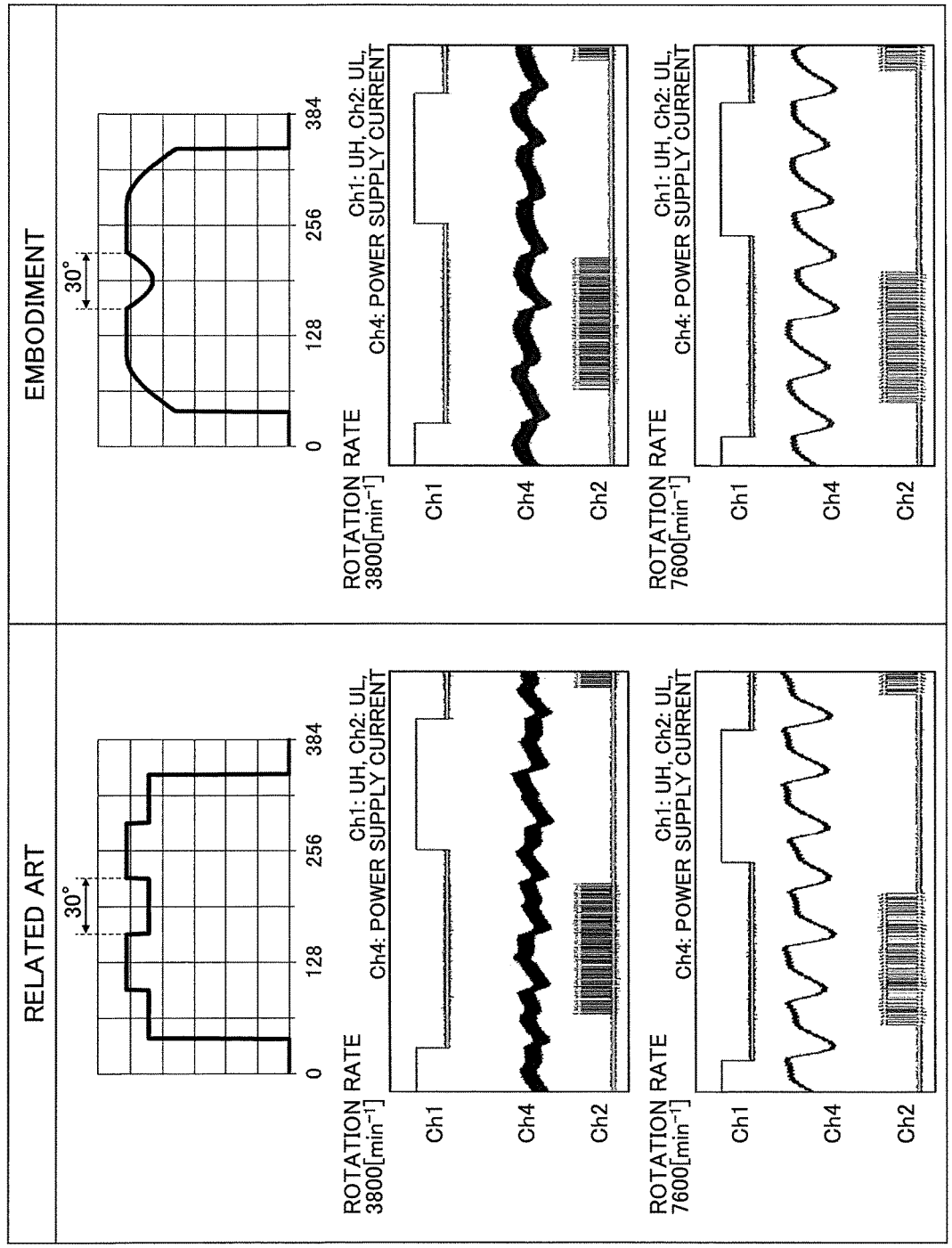
FIG. 6 is a drawing illustrating differences in power supply current between a related-art configuration and a present embodiment.

FIG. 6 is a drawing illustrating differences in power supply current between a related-art configuration and the present embodiment. The related-art configuration illustrated in FIG. 6 is directed to an example in which the magnitude of energization is fixedly set to a constant value during an overlapping period in which two adjacent windings are placed in the same energization period. The present embodiment illustrated in FIG. 6 is directed to an example in which the magnitude of energization exhibits a sinusoidal change during an overlapping period in which two adjacent windings are placed in the same energization period.

"Ch1" represents a voltage waveform of the drive signal UH. "Ch2" represents a voltage waveform of the drive signal UL. "Ch4" represents a waveform of power supply current that flows from the positive side 57 (see FIG. 1) of the power supply voltage VDD to the inverter 50.

As illustrated in FIG. 6, the present embodiment serves to reduce distortion occurring at the peaks of power supply current compared with the related-art configuration in the case of the rotation rate of motor 60 being either 3800 per minute or 7600 per minute. This arrangement serves to lower the vibration and noise of the motor 60.

Figure 7:
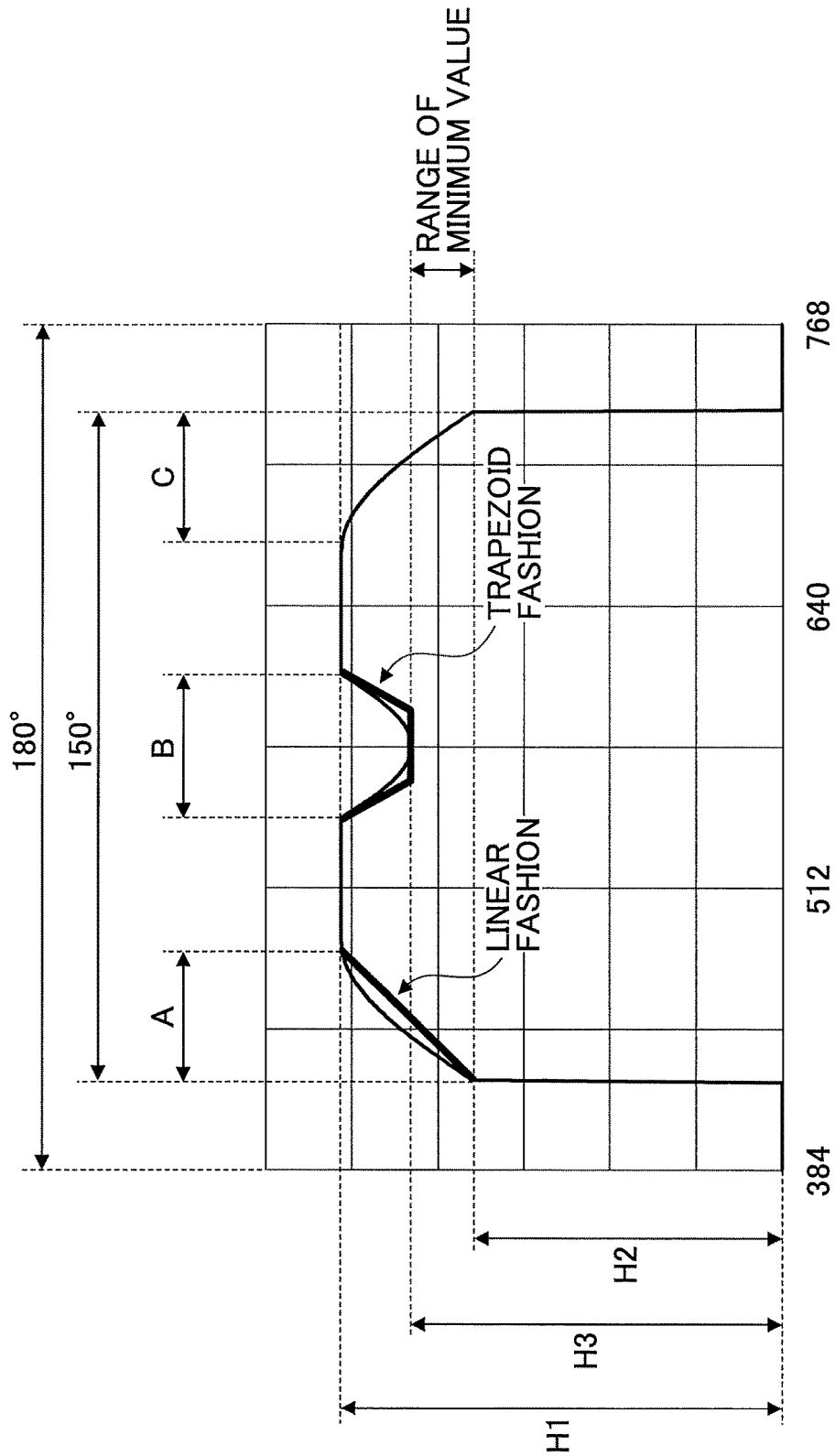
FIG. 7 is a drawing illustrating a variation of the energization waveform of a drive control signal.

FIG. 7 is a drawing illustrating a variation of the energization waveform of a drive control signal.

In the overlapping period A situated at the start section of energization, the control unit 20 increases, gradually in a linear or nonlinear fashion (preferably along a sinusoidal curve), the duty ratio of a PWM signal which is one of the drive control signals SUL, SVL, and SWL. This serves to reduce distortion occurring in power supply current. The control unit 20 increases the duty ratio of the drive control signals SUL, SVL, and SWL during the overlapping period A to the maximum value of the drive control signals, for example. Alternatively, the end point of the period of an increase in which the drive control signals SUL, SVL, and SWL increase gradually in a linear or nonlinear fashion may be positioned between the overlapping period A and the overlapping period B.

In the overlapping period C situated at the end section of energization, the control unit 20 decreases, gradually in a linear or nonlinear fashion (preferably along a sinusoidal curve), the duty ratio of a PWM signal which is one of the drive control signals SUL, SVL, and SWL. This serves to reduce distortion occurring in power supply current. The control unit 20 decreases the duty ratio of the drive control signals SUL, SVL, and SWL during the overlapping period C from the maximum value of the drive control signals, for example. Alternatively, the start point of the period of a decrease in which the drive control signals SUL, SVL, and SWL decrease gradually in a linear or nonlinear fashion may be positioned between the overlapping period B and the overlapping period C.

In FIG. 7, "H1" represents the maximum value of the magnitude (i.e., PWM duty ratio) of the drive control signals SUL, SVL, and SWL during the 150-degree energization period. "H2" represents the magnitude (i.e., PWM duty ratio) of the drive control signals SUL, SVL, and SWL at the start point of the overlapping period A situated at the start section of the 150-degree energization period or at the end point of the overlapping period C at the end section of the 150-degree energization period. The control unit 20 may output the drive control signals SUL, SVL, and SWL with H2/H1 being greater than or equal to 0.5 and smaller than or equal to 0.8 (more preferably greater than or equal to 0.6 and smaller than or equal to 0.7), thereby reducing distortion occurring at the peaks of power supply current. H2/H1 smaller than 0.5 causes the power supply current to exhibit a large drop during the 150-degree energization period, thereby resulting in an increase of ripples in power supply current. H2/H1 greater than 0.8 causes the power supply current to exhibit a large surge during the 150-degree energization period, thereby resulting in an increase of ripples in power supply current.

In the overlapping period B situated at the middle section of energization, the control unit causes the PWM duty ratio of the drive control signals SUL, SVL, and SWL to decrease gradually in a linear or nonlinear fashion and then to increase gradually in a linear or nonlinear fashion. For example, the control unit 20 causes the magnitude of the drive control signals SUL, SVL, and SWL to dip (e.g., in the form of a trapezoid or a sinusoidal curve). This serves to reduce distortion occurring in power supply current. It may be noted that the minimum value H3 of the drive control signals SUL, SVL, and SWL during the overlapping period B may be situated at the center of the overlapping period B or may be situated off the center.

The minimum value H3 may preferably be greater than the value H2 of the drive control signals SUL, SVL, and SWL situated at the start point of the overlapping period A or at the end point of the overlapping period C for the purpose of reducing distortion in power supply current. Further, the control unit 20 may output the drive control signals SUL, SVL, and SWL with H3 being greater than or equal to H2 and H3/H1 being smaller than or equal to 0.9. This arrangement serves to reduce distortion occurring at the peaks of power supply current. H3 smaller than H2 causes the power supply current to exhibit a large drop during the 150-degree energization period, thereby resulting in an increase of ripples in power supply current. H3/H1 greater than 0.9 causes the power supply current to exhibit a large surge during the 150-degree energization period, thereby resulting in an increase of ripples in power supply current.

Figure 8:
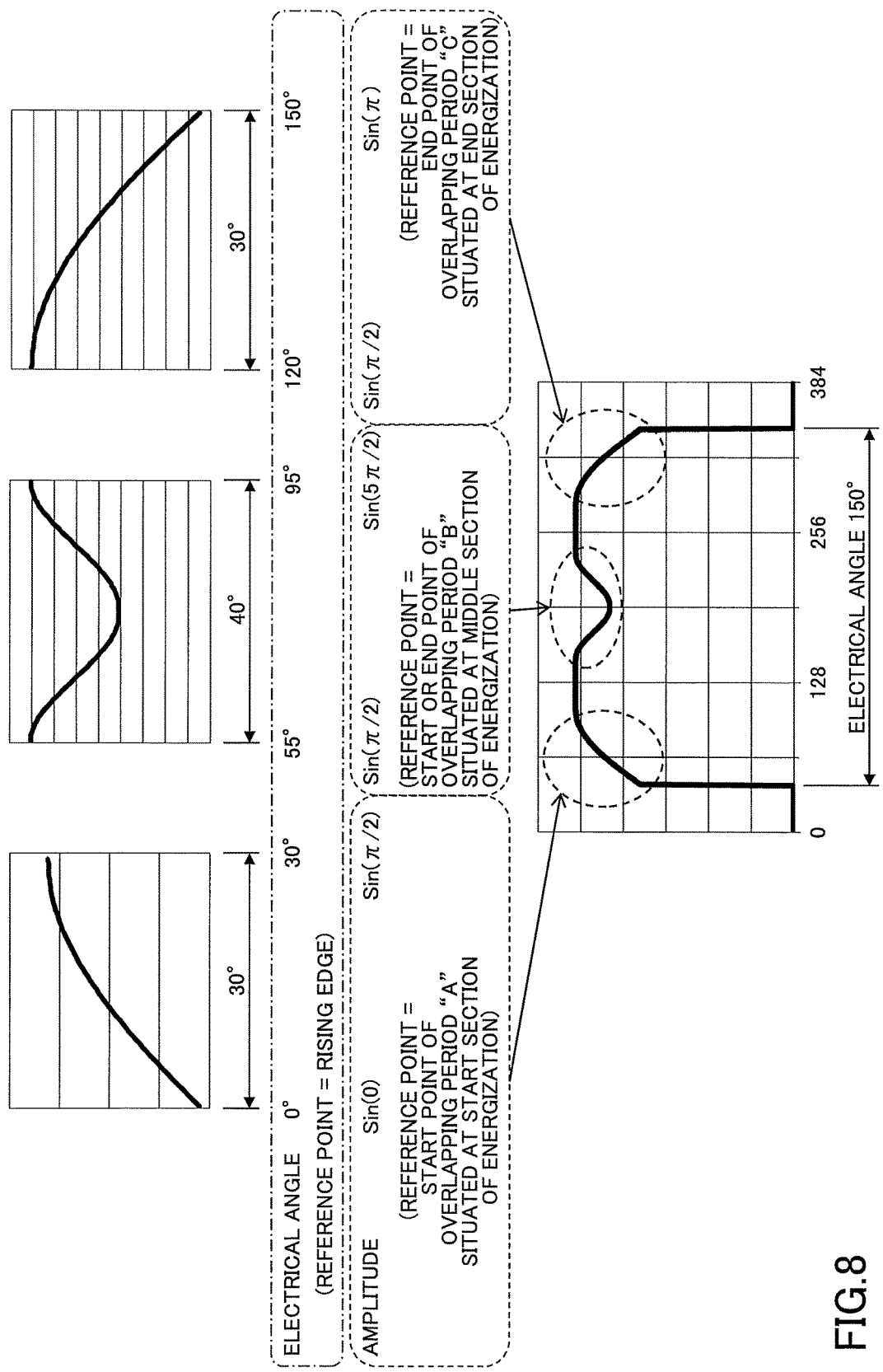
FIG. 8 is a drawing illustrating an example of the energization waveform of a drive control signal that exhibits a sinusoidal change in overlapping periods.

FIG. 8 is a drawing illustrating an example of the energization waveform of a drive control signal that exhibits a sinusoidal change in overlapping periods. The configurations of the overlapping periods A and C are the same as those illustrated in FIG. 5.

The control unit 20 generates the low-side drive control signals SUL, SVL, and SWL each of which exhibits a sinusoidal change from $\sin(\pi/2)$ to $\sin(5\pi/2)$ for a period (e.g., an electric angle range greater than 30 degrees and smaller than 60 degrees) longer than the overlapping period B at the middle section of energization. With this arrangement, the magnitude of energization of two adjacent windings dips (i.e., in the form of a sinusoidal curve from $\sin(\pi/2)$ to $\sin(5\pi/2)$) in the period longer than the overlapping period B, which serves to reduce distortion occurring in power supply current. This arrangement allows the magnitude of energization of the two adjacent windings to have a dip starting before the overlapping period B and ending after the overlapping period B, which serves to increase the magnitude by which distortion and ripples occurring in power supply current are reduced. FIG. 8 illustrates an example of the waveform of the low-side drive control signals SUL, SVL, and SWL exhibiting a sinusoidal change from $\sin(\pi/2)$ to $\sin(5\pi/2)$ during a period of 40 electrical degrees.

According to the present embodiment described above, the control unit 20 is configured to change the magnitude of energization of two adjacent windings gradually along a straight line or curve having any desired shape for an overlapping period during which these two adjacent windings among the phase windings 61, 62, and 63 are placed in the same energization state. This arrangement serves to reduce ripples in power supply current to the greatest extent.

In the related-art configuration in which the magnitude of energization is fixed to a constant value during an overlapping period, the magnitude of a PWM signal is changed in a digital manner (i.e., discrete or stepwise manner). In contrast, the present embodiment continuously (gradually) changes the magnitude of the drive control signals SUL, SVL, and SWL, which reduces ripples in power supply current more effectively.

Reduction of ripples in power supply current also results in reduced torque ripples during motor operation, thereby serving to reduce vibration and noise.

Although the motor drive controller has been described by referring to the embodiments, the present invention is not limited to these embodiments. Various modifications and improvements such as combining or replacing an embodiment partially or entirely with one or more other embodiments may be made without departing from the scope of the present invention.

For example, the control unit 20 may place the transistors 52, 54, and 56 in the "on" state for an energization period of 150 degrees in the switching circuits 50U, 50V, and 50W, respectively, when the transistors 51, 53, and 55 are placed in the "off" state, respectively. Specifically, the control unit 20 keeps the drive control signal SUL at such a signal level as to place the low-side transistor 52 in the "on" state for an energization period of 150 degrees while the control unit 20 keeps the drive signal SUH at such a signal level as to place the high-side transistor 51 in the "off" state. The same applies in the case of the control of the transistors 53 and 54 in the phase-V switching circuit 50V and in the case of the control of the transistors 55 and 56 in the phase-W switching circuit 50W.

In this case, the control unit 20 alternately places the transistors 51, 53, and 55 in the "on" state or in the "off" state for an energization period of 150 degrees in the switching circuits 50U, 50V, and 50W, respectively, when the transistors 52, 54, and 56 are placed in the "off" state, respectively. Specifically, the control unit 20 sets the drive control signal SUH at such signal levels as to drive the high-side transistor 51 with pulse width modulation (PWM) for an energization period of 150 degrees while the control unit 20 keeps the drive signal SUL at such a signal level as to place the low-side transistor 52 in the "off" state. The same applies in the case of the control of the transistors 53 and 54 in the phase-V switching circuit 50V and in the case of the control of the transistors 55 and 56 in the phase-W switching circuit 50W.

In this case, the control unit 20 controls the high-side transistors 51, 53, and 55 such as to change the magnitude of energization of two adjacent windings gradually in a linear or nonlinear fashion during overlapping periods A, B, and C during which these two adjacent windings among the phase windings 61, 62, and 63 are placed in the same energization condition. For example, the control unit 20 changes the waveforms of the drive control signals SUH, SVH, and SWH gradually in a linear or nonlinear fashion for controlling the respective transistors 51, 53, and 55 during the overlapping periods A, B, and C. With this arrangement, the magnitude of energization of two adjacent windings is changed gradually in a linear or nonlinear fashion during the overlapping periods A, B, and C.

In this manner, the operations of the high side and the operation of the low side may be reversed with respect to the configuration illustrated in FIG. 2, which still serves to reduce distortion or ripples in power supply current.

In the descriptions provided heretofore, the control unit 20 controls the motor drive unit 40 such that the phase windings 61, 62, and 63 are energized for respective energization periods of 150 electrical degrees. Notwithstanding this, the control unit 20 may be configured to control the motor drive unit 40 such that the phase windings 61, 62, and 63 are energized for respective energization periods each of which is greater than 120 electrical degrees and smaller than 180 electrical degrees. This configuration also serves to reduce distortion and ripples occurring in power supply current.

The motor is not limited to a brushless motor, and may alternatively be a motor of another type such as a stepping motor. The switching elements are not limited to field effect transistors, and may alternatively be a switching element of another type such as a bipolar transistor.

The present application is based on and claims the benefit of priority of Japanese priority application No. 2017-004375 filed on Jan. 13, 2017, with the Japanese Patent Office, the entire contents of which are hereby incorporated by reference.

What is claimed is:

1. A motor drive controller, comprising:
a motor drive unit configured to drive a motor having three-phase windings; and
a control unit configured to control the motor drive unit such that each of the three-phase windings is energized for an energization period greater than 120 electrical degrees and smaller than 180 electrical degrees,
wherein the motor drive unit includes an inverter that includes switching circuits for the three-phase windings, respectively, each of the switching circuits including two switching elements which are a high-side switching element coupled to a positive side of a power supply and a low-side switching element coupled to a negative side of the power supply,
wherein the control unit is configured to place a first switching element among the two switching elements in an "on" state for the energization period while placing a second switching element among the two switching elements in an "off" state, and to apply a pulse-width-modulation drive signal to the second switching element to place the second switching element alternately in the "on" state and in the "off" state for the energization period while placing the first switching element in the "off" state, and
wherein the control unit is configured to change a duty ratio of the pulse-width-modulation drive signal in an overlapping period during which two adjacent windings among the three-phase windings are placed in a same energization state, such that the duty ratio changes gradually in a linear or nonlinear fashion with a gradual rise or fall within the overlapping period.

2. The motor drive controller as claimed in claim 1, wherein the first switching element is the high-side switching element, and the second switching element is the low-side switching element.

3. The motor drive controller as claimed in claim 1, further comprising a memory circuit configured to store waveform data indicative of a waveform of a sinusoidal curve, wherein the control unit causes the duty ratio to increase, in accordance with the waveform data stored in the memory circuit, in the overlapping period situated at a start section of the energization period, and causes the duty ratio to decrease, in accordance with the waveform data stored in the memory circuit, in the overlapping period situated at an end section of the energization period.

4. The motor drive controller as claimed in claim 1, further comprising a memory circuit configured to store waveform data indicative of a waveform of a curve dipping at a center, wherein the control unit is configured to cause the duty ratio to change, in accordance with the waveform data stored in the memory circuit, during the overlapping period situated at a middle section of the energization period.

5. The motor drive controller as claimed in claim 4, wherein the memory circuit is configured to store waveform data indicative of a waveform of a sinusoidal curve from $\sin(\pi)$ to $\sin(2\pi)$, wherein the control unit is configured to cause the duty ratio to change, in accordance with the waveform data stored in the memory circuit, during the overlapping period situated at the middle section of the energization period.

6. The motor drive controller as claimed in claim 4, wherein the control unit is configured to cause the duty ratio to change, in accordance with the waveform data stored in the memory circuit, for a period longer than the overlapping period situated at the middle section of the energization period.

7. The motor drive controller as claimed in claim 6, wherein the waveform data indicates a waveform of a sinusoidal curve inclusive of at least a sinusoidal curve from $\sin(\pi/2)$ to $\sin(5\pi/2)$, and the control unit is configured to cause the duty ratio to change in accordance with the waveform data stored in the memory circuit.

8. The motor drive controller as claimed in claim 6, wherein the period longer than the overlapping period is greater than 30 electrical degrees and smaller than 60 electrical degrees.

9. The motor drive controller as claimed in claim 1, further comprising a memory circuit configured to store first waveform data corresponding to the overlapping period situated at a start section of the energization period and second waveform data corresponding to the overlapping period situated at an end section of the energization period, wherein the control unit is configured to change the duty ratio in accordance with the first waveform data and the second waveform data stored in the memory circuit, and wherein, when a maximum value of the first waveform data and the second waveform data is denoted as H1, and a value of a start point of the first waveform data or a value of an end point of the second waveform data is denoted as H2, the first waveform data and the second waveform data stored in the memory circuit are such that H1 and H2 are related as: H2/H1 being greater than or equal to 0.5 and smaller than or equal to 0.8.

10. The motor drive controller as claimed in claim 1, further comprising a memory circuit configured to store first waveform data corresponding to the overlapping period situated at a start section of the energization period, second waveform data corresponding to the overlapping period situated at an end section of the energization period, and third waveform data corresponding to the overlapping period situated at a middle section of the energization period, wherein the control unit is configured to change the duty ratio in accordance with the first waveform data, the second waveform data, and the third waveform data stored in the memory circuit, and wherein, when a maximum value of the first waveform data, the second waveform data, and the third waveform data is denoted as H1, and a value of a start point of the first waveform data or a value of an end point of the second waveform data is denoted as H2, with a minimum value of the third waveform data being denoted as H3, the first waveform data, the second waveform data, and the third waveform data stored in the memory circuit are such that H1, H2, and H3 are related as: H3 being greater than H2, and H3/H1 being smaller than or equal to 0.9.

11. The motor drive controller as claimed in claim 1, wherein the energization period has a length of 150 electrical degrees, and the overlapping period has a length of 30 electrical degrees.

12. A motor drive controller, comprising:
a motor drive unit configured to drive a motor having three-phase windings; and
a control unit configured to apply pulse-width-modulation drive signals to the motor drive unit such that each of the three-phase windings is energized for an energization period greater than 120 electrical degrees and smaller than 180 electrical degrees,
wherein the control unit is configured to change a duty ratio of the pulse-width-modulation drive signals gradually in a linear or nonlinear fashion with a gradual rise or fall within an overlapping period during which two adjacent windings among the three-phase windings are placed in a same energization state.

13. The motor drive controller as claimed in claim 1, wherein the duty ratio has no step change at either a start or an end, or both, of the overlapping period.

14. The motor drive controller as claimed in claim 12, wherein the duty ratio of the pulse-width-modulation drive signals has no step change at either a start or an end, or both, of the overlapping period.

15. A motor drive controller, comprising:
a motor drive unit configured to drive a motor having three-phase windings; and
a control unit configured to apply pulse-width-modulation drive signals to the motor drive unit such that each of the three-phase windings is energized for an energization period greater than 120 electrical degrees and smaller than 180 electrical degrees,
wherein the control unit is configured to change a duty ratio of the pulse-width-modulation drive signals in a linear or nonlinear fashion continuously from a start to an end of at least one overlapping period among a plurality of overlapping periods during which two adjacent windings among the three-phase windings are placed in a same energization state.

16. The motor drive controller as claimed in claim 15, wherein the duty ratio of the pulse-width-modulation drive signals has no step change at either a start or an end, or both, of the overlapping period.

* * * * *